United States Patent [19]
Kawamura

[11] Patent Number: 6,025,095
[45] Date of Patent: Feb. 15, 2000

[54] BATTERY ELECTRODE AND MANUFACTURING METHOD THEREOF

[75] Inventor: Hiroshi Kawamura, Kyoto, Japan

[73] Assignee: Japan Storage Battery Co., Ltd., Kyoto, Japan

[21] Appl. No.: 08/954,824

[22] Filed: Oct. 21, 1997

[30] Foreign Application Priority Data

Oct. 21, 1996 [JP] Japan ................................... 8-278471
Dec. 13, 1996 [JP] Japan ................................... 8-333204

[51] Int. Cl.$^7$ .................................................. H01M 4/80
[52] U.S. Cl. .................................. 429/235; 429/241; 29/2
[58] Field of Search .................................. 429/233, 235, 429/241, 242, 211; 29/2

[56] References Cited

U.S. PATENT DOCUMENTS 2,724,733  11/1955  Hagspihl et al. .......................... 29/2
5,655,295   8/1997  Sugikawa .................................. 429/235
5,677,088  10/1997  Kobayashi ................................. 429/235

FOREIGN PATENT DOCUMENTS 0 651 451  5/1995  European Pat. Off. ......... H01M 4/70
2757569    6/1979  Germany ............................... 429/241
9102117    1/1993  Netherlands ........................ B32B 3/24

OTHER PUBLICATIONS

Patent Abstracts of Japan vol. 096, No. 008, Aug. 30, 1996 & JP 08 106906 A (Matsushita Electric Ind Co Ltd) Apr. 23, 1996, Abstract.

Patent Abstracts of Japan vol. 011 No. 363 (E–560), Nov. 26, 1987 JP 62 136767 A (Matsushita Electric Ind Co Ltd) Jun. 19, 1987 *Abstract.

Patent Abstracts of Japan vol. 011, No. 231 (E–527) Jul. 28, 1987, & JP 62 047963 A (Shin Kobe Electric Mach Co Ltd) Mar. 2, 1987 *Abstract.

*Primary Examiner*—Maria Nuzzolillo
*Assistant Examiner*—Susy Tsang
*Attorney, Agent, or Firm*—Sughrue, Mion, Zinn, MacPeak & Seas, PLLC

[57] ABSTRACT

After a band-like nickel fiber felt is joined to the surface of a belt-shaped punching metal having a large number of openings and sintered, the positive electrode active material is carried on the nickel fiber felt to fabricate a positive electrode.

8 Claims, 10 Drawing Sheets

BATTERY ELECTRODE AND MANUFACTURING METHOD THEREOF

BACKGROUND OF THE INVENTION

1. Field of the Invention

The present invention relates to a battery electrode with an active material on a three-dimensional porous body such as a foamed metal and non-woven cloth metal, and a manufacturing method thereof.

2. Description of the Related Art

In order to improve an active material loading level to increase a battery capacity, some electrodes use foamed metal or non-woven cloth-like metal. For example, a nickel-hydrogen secondary battery uses an positive electrode made of a foamed nickel (foamed metal), nickel fiber felt (non-woven metal) or the like. The foamed nickel may be created by plating urethane foam containing carbon to have conductivity with nickel and baking it to blow off the compositions of urethane and carbon to leave only the foamed metallic nickel. Such a foamed nickel constitutes a very porous three-dimensional body with a large number of nickel frames three-dimensionally coupled with one another in a network (mesh). The nickel fiber felt may be created by baking nickel slender fibers made by e.g. chattering vibration into a felt (non-woven) cloth. Such a nickel fiber felt also constitutes a very porous three-dimensional body with a large number of nickel fibers three-dimensionally coupled with one another in a network (mesh). Therefore, if powder (non-aqueous) of nickel hydroxide which serves as an active material dispersed in a dispersant such as water is applied in these three-dimensional porous body and dried, a large quantity of active material can be surely carried in the gaps among a large number of frames or fibers coupled in a network to increase the filling density of the active material. This increases the battery capacity greatly.

Meanwhile, the three-dimensional porous body must collect current through a current collector of a metallic sheet for its connection to a terminal of a battery. However, it is difficult to connect the current collector to the three-dimensional porous body containing the active material directly by welding, because the active material hinders welding and the mechanical strength of the frames or fibers of the three-dimensional porous body is low.

Therefore, conventionally, a part of the three-dimensional porous body was previously pressed and was caused to carry the active material. The current collector was welded or press-fitted to the pressed area. Specifically, if the three-dimensional porous body is pressed, the frames of fibers of the pressed area are formed as a metallic sheet so that the active material is not directly applied to the pressed area. For this reason, after the active material is carried on the three-dimensional porous body, the electric collector can be welded to the pressed area, thus assuring the connection. In some cases, after the active material was once carried on the three-dimensional porous body, ultrasonic vibration is applied to an area of the three-dimensional porous body to remove the active material, and the current collector was welded to the removed area.

In some cases, belt-shaped steel which serves as an electric collector was crimped on the entire surface of the three-dimensional porous body.

However, conventionally, as described above, with an area of the three-dimensional porous body pressed previously or the active material removed, the current collector must be welded or crimped on the three-dimensional body.

In addition, since such a step was required for each of the electrodes, the productivity of the battery was attenuated.

Further, application of slight pressing force to the three-dimensional porous body crushes the frames or intimately couples the fibers with each other, and application of slight pulling force thereto extends the network portion to reduce the thickness of the entire three-dimensional porous body. This makes it impossible to carry the active material on the three-dimensional body. In addition, increasing the pulling force cleaves the three-dimensional body easily. For this reason, careful handling is required in the steps of carrying the active material on the three-dimensional porous body, performing the other processing, and winding the three-dimensional porous body in the case of a winding type power generating device. This makes it difficult to improve the productivity in manufacturing of an electrode by transferring three-dimensional bodies successively for its processing on a production line. Further, particularly, where the current collector is welded or crimped on an area of the three-dimensional porous body, when force is applied during the operation of assembling the battery, the three-dimensional porous body is easily cleaved or cut at its welding part or crimping part. Moreover, when such a current collector is attached to a portion of the three dimensional porous body, the electric resistance for current collection increases because the contact area of the current collector and the three-dimensional porous body is small.

Where the band-like steel is directly crimped on the three-dimensional porous body carrying the active material, the contact resistance therebetween becomes unstable according to the active material. This does not assure the electrical contact necessarily.

SUMMARY OF THE INVENTION

It is an object of the present invention to provide a battery electrode which permits sufficient connection to a current collecting plate to improve battery performance by avoiding the formation of openings at an edge area of a conductive sheet of the electrode.

It is an object of the present invention to provide a method of manufacturing a battery electrode which carries an active material in a three-dimensional porous body sintered on a conductive sheet to increase the productivity of the electrode so that the three-dimensional porous body is easily handled to assure current collection through the conductive sheet.

In a first aspect of the present invention, a battery electrode carrying an active material in a joined body comprises: a conductive sheet having a large number of openings made in its surface exclusive of at least its one edge area; and a sheet-like three dimensional metallic porous body joined to the surface exclusive of at least one edge area of a front and/or rear surface of the conductive sheet.

In accordance with the first aspect of the invention, no openings are formed at the edge area of the conductive sheet so that the entire edge area can be connected to the current collecting plate, thus enhancing the current collecting efficiency to decrease the internal resistance of the battery. The openings are not formed at least at the edge area to be connected to the current collecting plate.

Further, in a second aspect of the present invention, a battery electrode carrying an active material in a joined body comprises: a conductive sheet having a large number of openings made in its surface exclusive of at least its one edge area; and a sheet-like three dimensional metallic porous body joined to the surface including one edge of a front and/or rear surface of the conductive thin plate and having a pressed portion joining the one edge area.

In accordance with the means second aspect of the invention, in the battery which is manufactured in such a manner that the areas of the three-dimensional porous body joined to the conductive sheet are pressed, active material is carried therein and the pressed areas are cut, no openings are formed at the edge area of the conductive sheet by cutting so that the entire edge area can be connected to the current collecting plate, thereby enhancing current collecting efficiency to decrease the internal resistance of the battery. .

Moreover, in a third aspect of the invention includes a manufacturing method wherein, a sheet-like three-dimensional porous body joined to a surface of a conductive sheet containing a large number of openings is sintered; and an active material on the three-dimensional porous body sintered by the sintering step is carried.

In accordance with the third aspect of the invention, the three-dimensional porous body before the active material is carried thereon is sintered to the conductive sheet, a very large number of fiber pieces or frames on the contact face of the three dimensional porous body are joined to the surface of the conductive sheet, thereby making sure electrical connection between the three dimensional porous body and the conductive sheet. Further, since the three-dimensional porous body is caused to carry the active material in a state where it is sinter-joined to the conductive sheet, it can be easily handled using the conductive sheet as a support in the transfer and winding operation. Moreover, since there can be omitted the step of previously pressing an area of the three dimensional porous body for each electrode or remove the active material to weld the current collector to the three dimensional porous body before its winding, the productivity of the battery can be improved.

DETAILED DESCRIPTION OF THE INVENTION

The present invention will be described in detail referring to the accompanying drawings.

Figure 6:
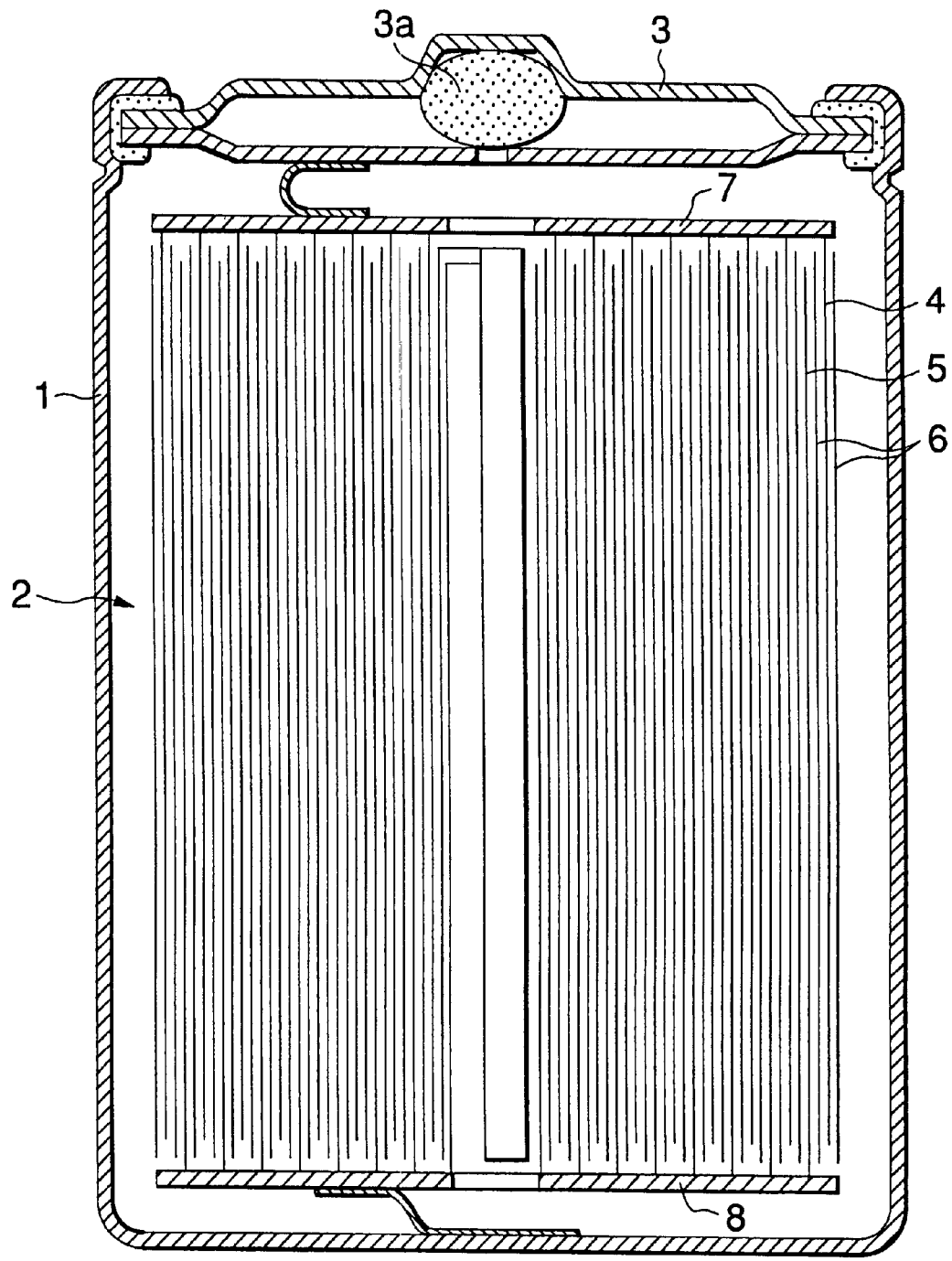
FIG. 6 is a longitudinal sectional view showing the structure of a nickel-hydrogen secondary battery.

First, descriptions will be given of an embodiment relating to a method of manufacturing a positive electrode which is used for a winding-type power generating element of a nickel-hydrogen secondary battery. As shown in FIG. 6, the nickel-hydrogen secondary battery houses a power generating element 2 within a battery can 1, which is filled with electrolyte and internally sealed with a battery cover 3 through an insulator. The power generating element 2 is constituted by winding band-like positive and negative electrodes 4, 5 through a band-like separator 6. These positive electrode 4, separator 6 and negative electrode 5 are wound in a state vertically displaced little by little so that only the upper edge of the positive electrode 4 is protruded on the upper side of the power generating element 2 and only the lower edge of the negative electrode 5 is protruded on the lower side thereof. An upper current collecting plate 7 is welded to the upper edge of the positive electrode 4 protruding on the upper side of the power generating element 2, whereas a lower current collecting plate 8 is welded to the lower edge of the negative electrode 5 protruding on the lower side thereof. These current collecting plates 7 and 8 are connected to the rear surface of the battery cover 3, and the inside bottom of the battery can 1 through leading pieces, respectively. Thus, the central protrusion of the battery cover 3 serves as a positive electrode terminal, and the bottom of the battery can 1 serves as a negative electrode terminal. It should be noted that the battery cover 3 is equipped with a rubber valve 3a for gas venting.

Figure 2:
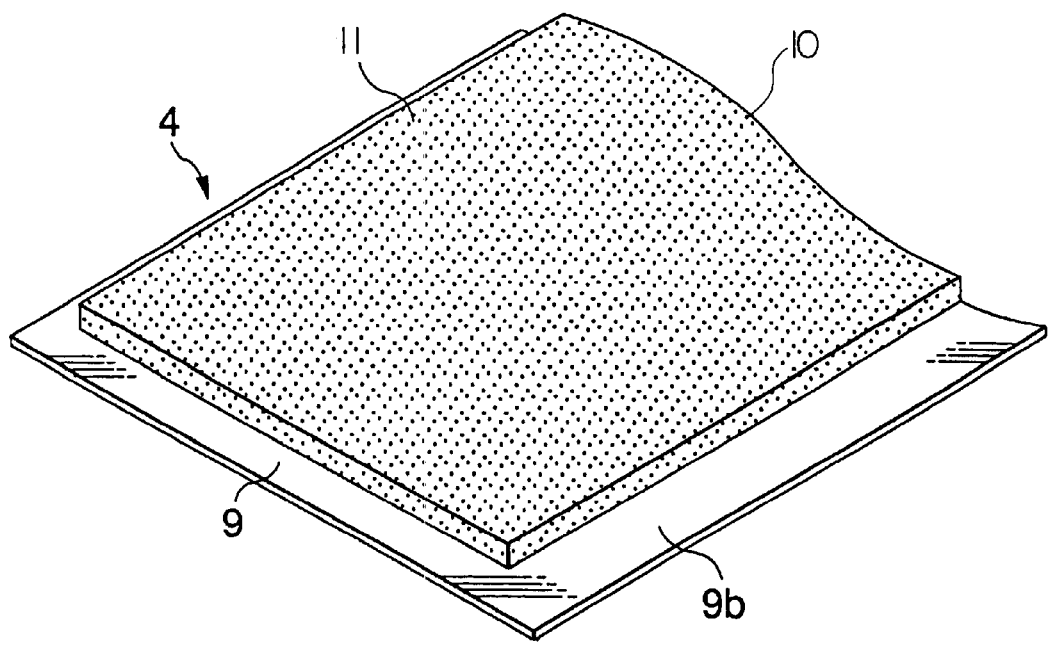
FIG. 2 shows an embodiment of the present invention and is a perspective view of an positive electrode.
Figure 3:
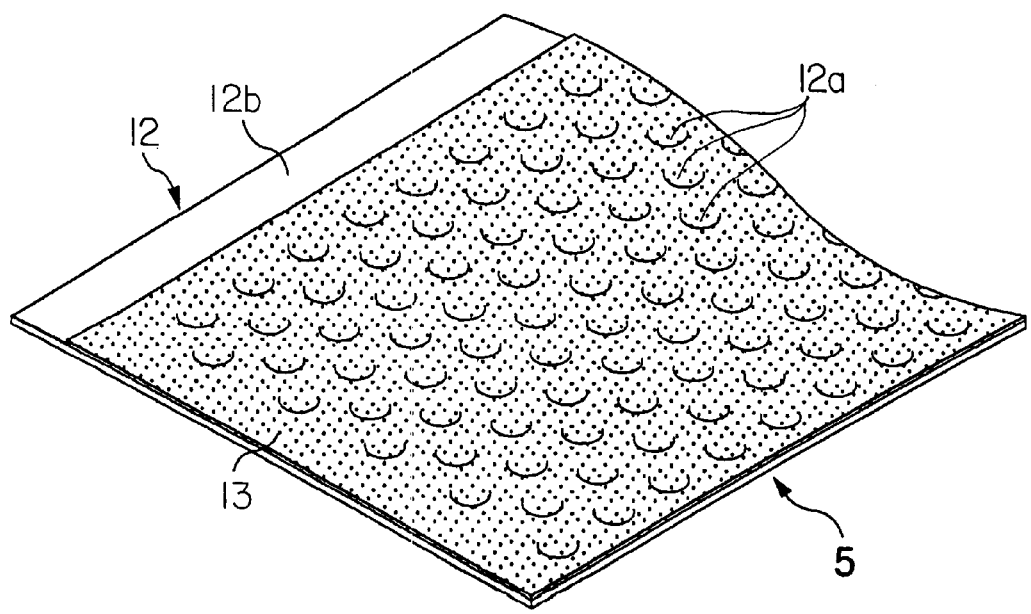
FIG. 3 shows an embodiment of the present invention and is a perspective view of a negative electrode.

As shown in FIG. 2, the positive electrode 4 is a band-like nickel fiber felt 10 which is joined to the surface of a band-like punching metal 9 and carries a positive electrode active material 11 having nickel hydroxide as a main composition. Further, as shown in FIG. 3, the negative electrode 5 is a punching metal 12 carrying a negative electrode active material 13 mainly composed of a hydrogen-absorbing alloy. These punching metals 9 and 12 have a large number of openings 9a made in a nickel sheet by pressing (In FIG. 2, they are blinded by the nickel fiber felt 10) and a large number of openings 12a (In FIG. 3, they are seen as hollows of the negative electrode active material). The separator 6 is made of insulating non-woven cloth passing electrolyte. The electrolyte may be a caustic solution.

The negative electrode 5 is made by applying and drying a mixed paste of powdery hydrogen-absorbing alloy and a binder onto both surfaces of the punching metal 12 so that the negative electrode active material 13 on a thick film is applied and carried to cover both surfaces and block the openings 12a as shown in FIG. 3. In this case, the negative active material 13 is not applied to the band-like lower edge of the punching metal 12 so that the lower edge 12b of the punching metal 12 of the negative electrode 5 is protruded from the lower side of the power generating element 2. Therefore, the lower current collecting plate 8 can be easily welded to the lower edge of the punching metal to which the negative electrode active material 13 is not applied.

Figure 1:
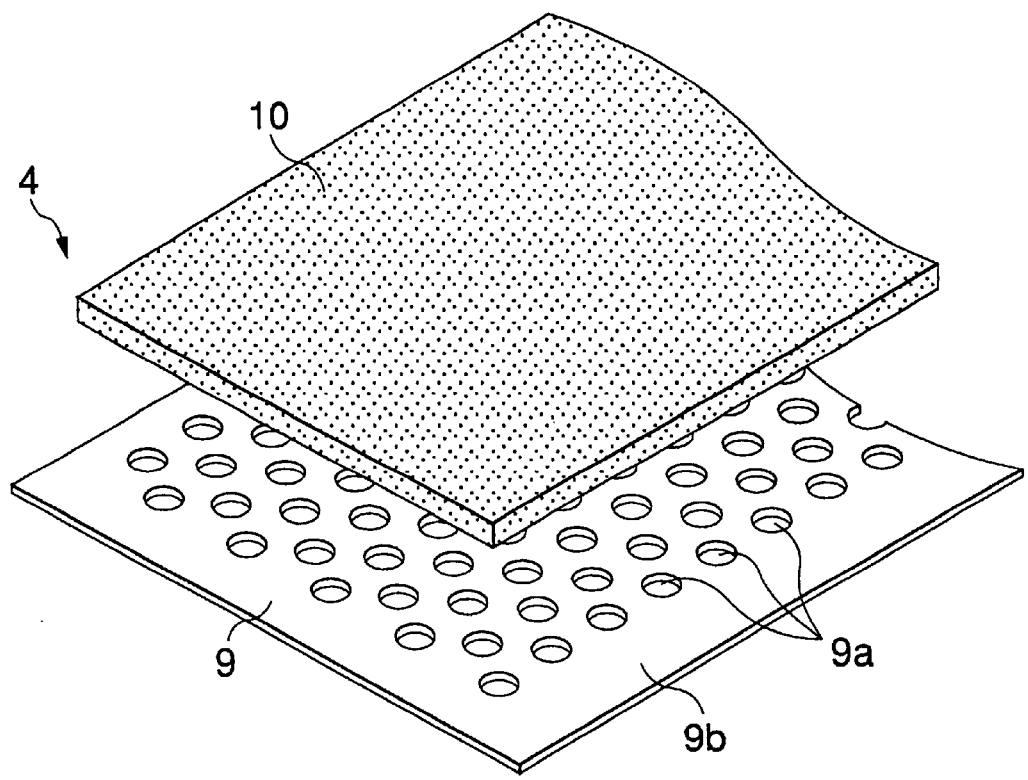
FIG. 1 shows an embodiment of the present invention and is an exploded perspective view showing the structure of a positive electrode.

An explanation will be given of one example of a method of manufacturing the positive electrode 4. As shown in FIG. 1, the nickel fiber 10 joined to the surface of the punching metal 9 by relatively weak pressing force is heated at 850° C. to 1000° C. so that the nickel fiber felt 10 is sintered to the surface of the punching metal 9. Then, at the contact face of the nickel fiber felt 10, a very large number of fiber pieces are applied onto the surface of the punching metal 9 and opening edges of the openings 9a through surface diffusion or partial melting of nickel. In this case, the nickel fiber felt 10 having a width slightly smaller than that of the punching metal 9 is used so that it is joined to the punching metal 9 so as to give a gap having a certain size at least at an edge area 9b of the punching metal 9 as shown in FIG. 2. After the nickel fiber felt 10 has been sinter-joined to the surface of the punching metal 9, a paste, in which water is added to powder mainly containing nickel hydroxide, is applied to the nickel fiber felt 10 and dried so that the positive active material 11 is carried in the nickel fiber felt 10. A large amount of the positive electrode active material 11 is applied to and carried in gaps among many fiber pieces of the nickel fiber felt 10. However, since the positive active material 11 is not directly applied to the punching metal 9 which is the nickel sheet, it is not applied to the edge area 9b to which the nickel fiber felt 10 is not sintered. For this reason, where the upper current collecting plate 7 is to be welded to the edge area 9b of the punching metal 9, the positive electrode active material will not hinder the welding.

The punching metal 9 and the nickel fiber felt 10 may be joined by a technique other than sintering.

Figure 7:
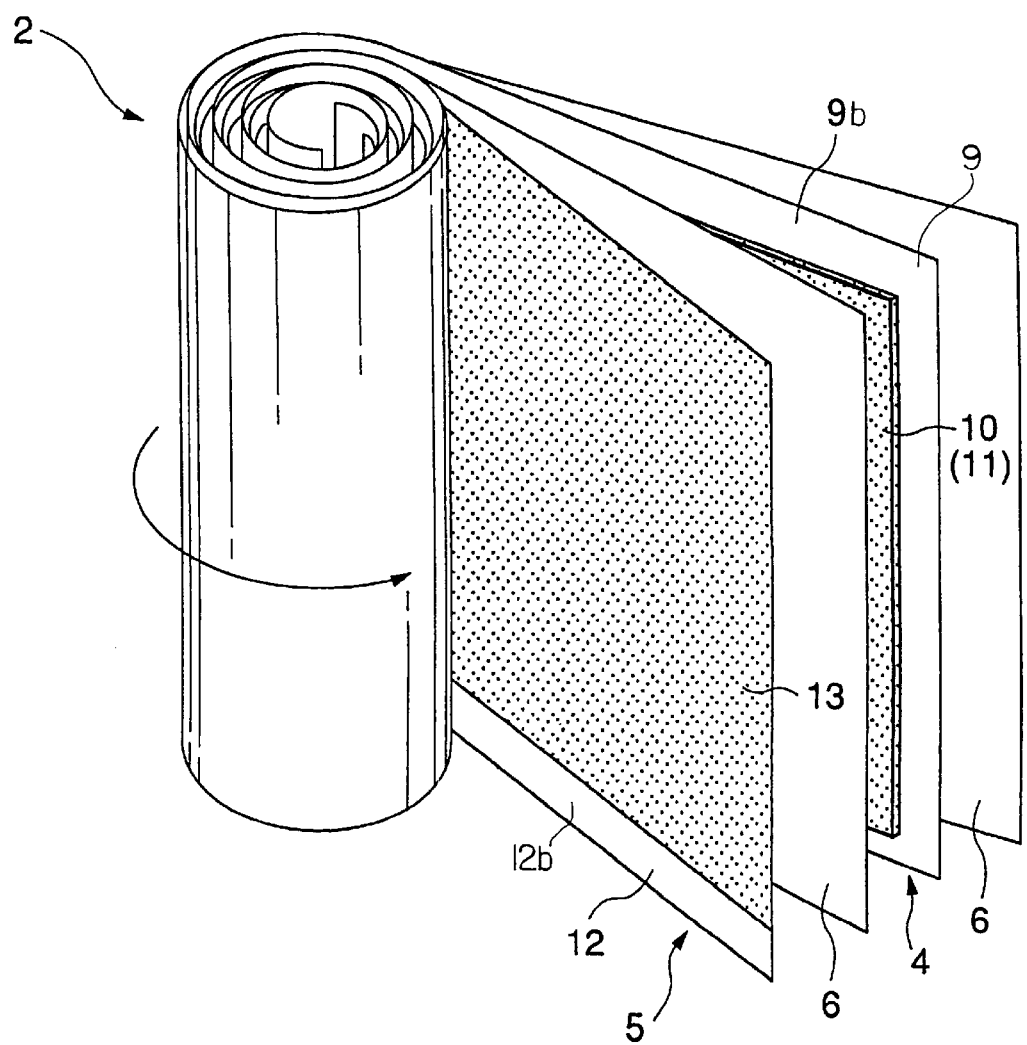
FIG. 7 is a perspective view of a power generating element.

The positive electrode 4 manufactured by the above process, as shown in FIG. 7, is wound together with the negative electrode 5 with the separator 6 therebetween to constitute a winding-type power generating element 2. The positive electrode 4 is wound in a state where it is displaced upward oppositely to the negative electrode 5 with respect to the separator 6 so that the upper current collecting plate 7 as shown in FIG. 6 is welded to the edge area 9b of the positive electrode projecting on the upper end side of the power generating element 2. In this case, since no opening 9a is formed at the edge area of the punching metal 9, the entire edge area 9b is welded to the upper current collecting plate 7. Therefore, unlike the case wherein the openings 9a are formed at the edge area 9b to provide notches, the punching metal 9 and the upper current collecting plate 7 are always connected in the largest connecting area so that the current collecting efficiency from the positive electrode 4 to the positive electrode terminal (battery cover 3) through the upper current collecting plate 7 is enhanced to reduce the internal resistance of the battery.

As a result, the nickel-hydrogen secondary battery using the positive electrode 4 according to this embodiment for the power generating element 2 can enhance the current collecting efficiency between the punching metal 9 and the upper collecting plate 7 to reduce the internal resistance, thus surely improving the battery performance.

The negative electrode 5 is made by applying and drying the negative electrode active material 13 of a mixed paste of powdery hydrogen-absorbing alloy and a binder onto both surfaces of the punching metal 12. In this case, the negative electrode active material 13 is not applied to the one edge area 12b of the punching metal in its longitudinal direction. Therefore, if the edge area, 12b of the punching metal 12 is located on the lower side of the negative electrode 5, the lower current collecting plate 8 shown in FIG. 6 can be easily welded thereto. The current collecting efficiency by the lower current collecting plate 8 is preferably enhanced in such a manner that no opening is formed at the edge area 12b of the punching metal 12 on the side of the negative electrode 5.

Figure 4:
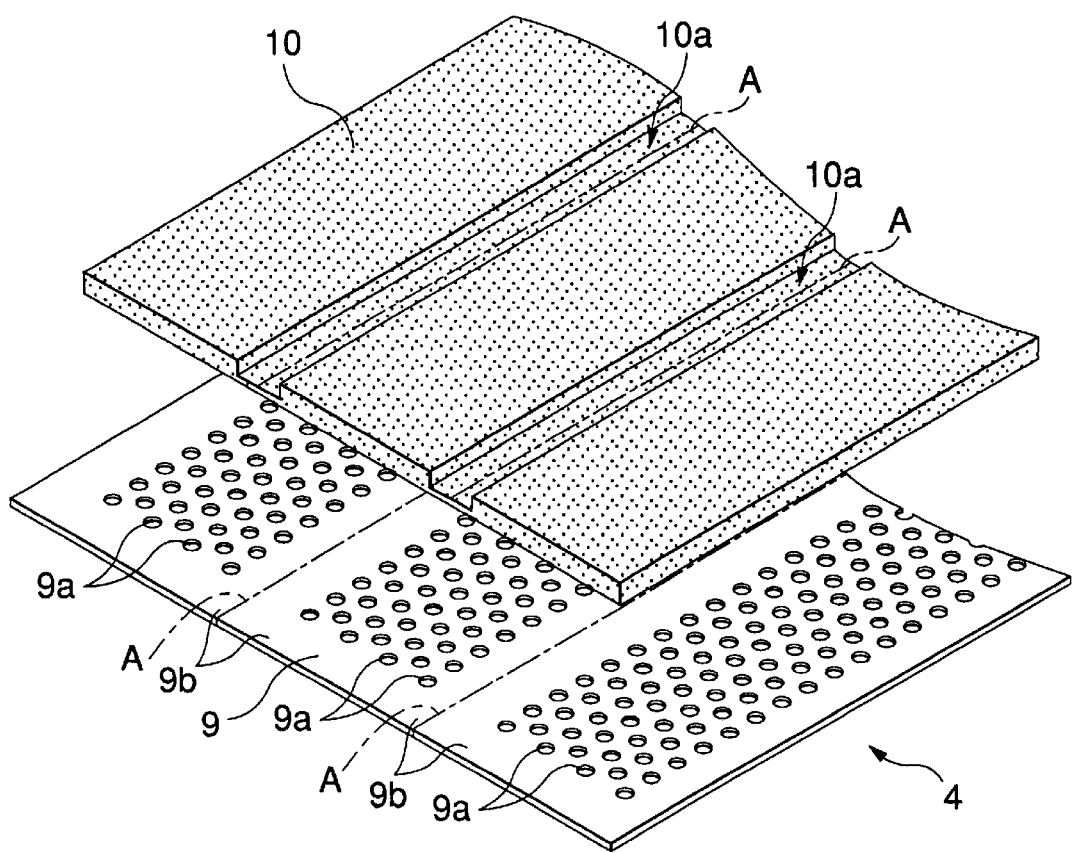
FIG. 4 shows an embodiment of the present invention and is an exploded perspective view showing the intermediate state in the process of manufacturing a plurality of positive electrodes.

The above positive electrode 4 can be manufactured in such a manner that the belt-shaped punching metal 9 and nickel fiber felt 10 supplied from respective rolls in line processing are successively subjected to the steps of joining the nickel fiber felt 10, carrying the positive electrode active material and cutting it into suitable lengths. In this case, if the wide nickel fiber felt 10 is supplied to the punching metal 9 which is also wide, a plurality of sheets of positive electrodes 4 can be manufactured simultaneously. Specifically, as shown in FIG. 4, after the wide nickel fiber felt 10 has been sinter-joined to the wide punching metal 9, parts of the 25 nickel fiber felt 10 are pressed along the longitudinal direction to form pressed areas 10a (in FIG. 4, the nickel fiber felt 10 with the pressed areas 10a is shown). Further, after having carried the positive electrode active material in the nickel fiber felt 10, the pressed area 10a is cut along a cutting line A indicated by one-dot chain line. Thus, a plurality of positive electrodes 4 can be manufactured effectively. In this case, the punching metal 9 is adapted so that the openings 9a are not formed in the vicinity of the cutting lines A. For this reason, when the pressed area 10a is cut along the cutting lines A, no opening is formed at the edge area 9b of the punching metal 9. Thus, when the upper current collecting plate 7 shown in FIG. 6 is welded to the edge area 9b, the current collecting efficiency of the upper collecting plate 7 can be enhanced to reduce the internal resistance of the battery.

In the present invention, the configuration of the positive electrode 4 in the above embodiment should not be limited. In other words, the configuration of the negative electrode 5 and that of the structure connecting the positive electrode 4 and negative electrode 5 to the positive electrode terminal of the battery cover 3 and the negative electrode terminal of the battery can 1 through the current collecting plates 7 and 8, respectively, should not be limited to those in this embodiment.

In the above embodiment, although the nickel fiber felt has been joined to only the surface of the punching metal 9 of the positive electrode 4, nickel fiber felts 10 can be joined to both surfaces of the punching metal 9. In this case, on the rear side of the punching metal 9, electrolyte can also be easily brought into contact with the positive electrode active material carried in the nickel fiber felt 10. In addition, the fiber pieces of the nickel fiber felts on both front and rear surfaces of the punching metal 9 are entangled with each other through the openings 9a of the punching metal 9. Thus, the binding strength of these nickel fiber felts 10 is enhanced.

In this embodiment, although the nickel-hydrogen secondary battery 4 has been explained, the present invention is applied to any battery as long as it can be a battery capable of using a three-dimensional porous body for its electrode.

In this embodiment, although the nickel fiber felt 10 has been used as a three-dimensional porous body, any conductor which is three-dimensionally porous, e.g. nickel-foam can be used. In addition, the kind of the conductor is not limited to such nickel, but can be optionally selected according to the kind of the battery and electrode.

Further, in this embodiment, although the punching metal 9 of a nickel sheet has been used as a conductive sheet, any conductive sheet which includes a large number of openings having any shape and size can be used. In addition, the kind of the conductor is not limited to such nickel, but can be optionally selected according to the kind of the battery and electrode.

In the embodiment, although a winding type power generating element 2 used for a cylindrical battery was proposed, the present invention can be applied to a laminating type power generating element used for a square pillar type battery. In the laminating type of the power generating element, the punching metal 9 and the nickel fiber felt 10 should not be belt-shaped (lengthy sheet-like) but a plate-like (short sheet-like).

An explanation will be given of another method of manufacturing the positive electrode 4. As shown in FIG. 1, a band-like nickel fiber felt 10 is joined to the surface of a band-like punching metal 9 and sintered (three-dimensional porous sintering step). Specifically, the nickel fiber 10 joined to the surface of the punching metal 9 by relatively weak pressing force is heated at 850° C. to 1000° C. Then, at the contact face of the nickel fiber felt 10, a very large number of fiber pieces are applied onto the surface of the punching metal 9 and opening edges of the openings 9a through surface diffusion or partial melting of nickel. Thus, as shown in FIG. 2, the nickel fiber felt 10 is sinter-joined to the punching metal 9 so that it is easily taken off. In this case, if the nickel fiber felt 10 having a width slightly smaller than that of the punching metal 9 is used, it is joined to the punching metal 9 so as to give a gap having a certain size at least at the upper edge of the punching metal 9. The nickel fiber felt 10 joined to the punching metal 9 in this way can be easily handled for its transfer or winding since the punching metal 9 serves as a support. So, during the operation of the succeeding steps, the nickel-fiber felt 10 will not be extended or torn by application of excessive force.

After the nickel fiber felt 10 has been sinter-joined to the surface of the punching metal 9 in the three-dimensional porous body sintering step, a water solution of powder mainly containing nickel hydroxide is applied to the nickel fiber felt 10 and dried so that the positive active material 11 is carried on the nickel fiber felt 10 (active material carrying step). More specifically, a large amount of the positive electrode active material 11 mainly having nickel hydroxide is applied to and carried in gaps among many fiber pieces of the nickel fiber felt 10. However, it should be noted that the positive active material 11 is not directly applied to the punching metal 9 which is the nickel sheet. In this active material carrying step, the nickel fiber 10 can be processed using the punching metal as a support as described above. For this reason, it will not be extended so as to become thin. Thus, the carrying amount of the positive electrode active material also 11 will not be also reduced.

The positive electrode 4 manufactured by the above process, as shown in FIG. 7, is wound together with the negative electrode 5 with the separator 6 therebetween to constitute a winding-type power generating element 2. The upper edge of the positive electrode 4 projecting from the upper end of the power generating element 2 becomes that of the punching metal 9 to which the nickel fiber felt 10 and hence the positive electrode active material are not applied. Therefore, the upper current collecting plate 7 can be easily welded to the punching metal 9.

As understood from the description made hitherto, in accordance with the method of manufacturing the positive electrode 4 of the nickel-hydrogen secondary battery in this embodiment, the nickel fiber felt 10 before carrying the positive electrode active material 11 is sinter-joined to the punching metal 9 so that the electrical connection therebetween can be assured. Thus, if the positive electrode active material 11 is carried on the nickel fiber felt 10, current collecting can be stably performed by the punching metal 9 from the positive electrode active material 11 through the nickel fiber felt 10. Further, unlike the nickel fiber felt 10, the punching metal 9 does not carry the positive electrode active material 11. For this reason, the upper current collecting plate 7 can be easily welded to its upper edge projecting on the side of the power generating element 2, and the battery cover 3 serving as the positive electrode terminal can be easily connected to the punching metal 9. In addition, since this positive electrode 4 is subjected to the active material carrying step and the winding step of the power generating element 2 using the punching metal 9 as a support, it can be easily transferred without applying excessive force to the nickel fiber felt 10 which is difficult to handle by itself, thus improving the workability.

Figure 11:
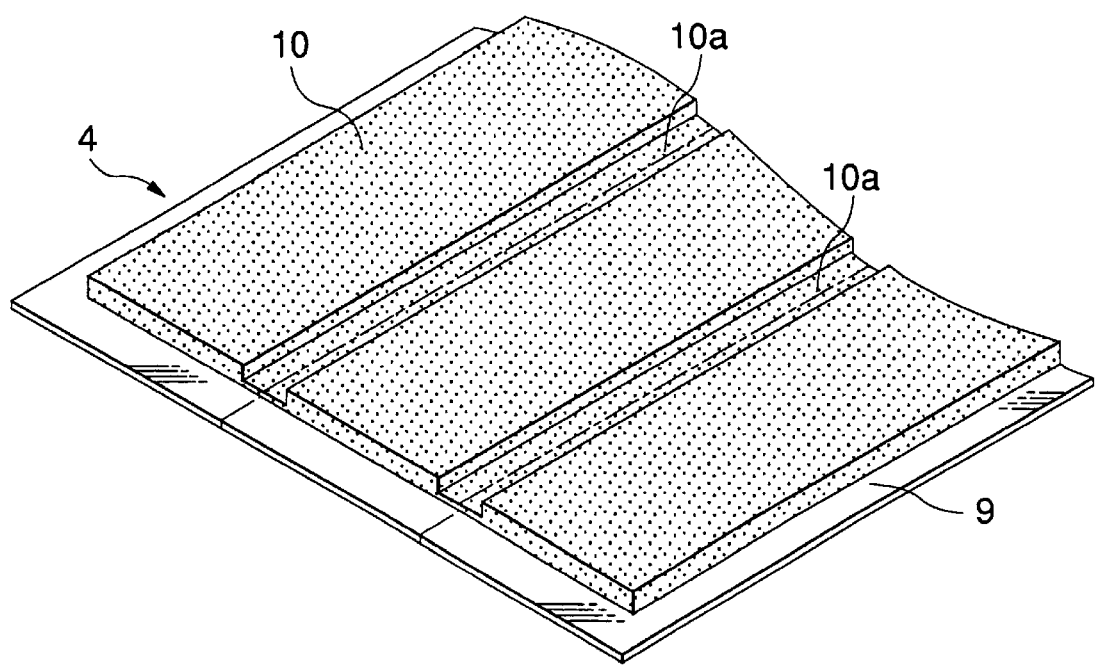
FIG. 11 is an exploded perspective view showing the state of the second step of the process of manufacturing a plurality of positive electrodes.

The above positive electrode 4 can be manufactured in such a manner that the belt-shape punching metal 9 and nickel fiber felt 10 supplied from respective rolls in line processing are successively subjected to the three-dimensional porous body sintering step and active material carrying step and cut into their suitable lengths. In this case, if the nickel fiber felt 10 which is wide is supplied to the punching metal 9 which is also wide, a plurality of sheets of positive electrodes 4 can be manufactured simultaneously. Specifically, after the porous body sintering step of sinter-joining the wide nickel fiber felt 10 to the wide punching metal 9 is carried out, as shown in FIG. 11, areas of the nickel fiber felt 10 are pressed toward the side of the punching metal 9 along the longitudinal direction (pressing step) to divide the nickel fiber felt 10 into a plurality of tracks at the pressed areas 10a (divided in three tracks in FIG. 11). Further, the active material carrying step of carrying the positive electrode active material 11 on the nickel fiber felt 10 is performed. Thereafter, the punching metal 9 and nickel fiber felt 10 are cut along the pressed areas 10a (along one-dot chain line in FIG. 11) for each of the tracks (cutting step). Thus, a plurality of positive electrodes 4 can be manufactured effectively. In this case, it should be noted that at the cutting portion of the punching metal 9, the pressed area 10a of the nickel fiber felt 10 has been sinter-joined so as to extend to the edge of the cutting portion with no gap. However, each of the pressed areas 10a, where a large number of fiber pieces have been crushed, becomes nickel-sheet-like so that the positive electrode active material 11 is not directly applied to the pressed area 10a in the active material carrying step. Thus, even if the cutting portion is an upper edge projecting from the upper end of the power generating element 2, the upper current collecting plate 7 can be easily welded to the upper edge.

In the present invention, a configuration other than the positive electrode 4 in the above embodiment is not limited. In other words, the configuration of the negative electrode 5 and that of the structure connecting the positive electrode 4 and negative electrode 5 to the positive electrode terminal of the battery cover 3 and the negative electrode terminal of the battery can 1 through the current collecting plates 7, 8, respectively, should not be limited to those in this embodiment.

In the above embodiment, although the nickel fiber felt has been sintered to only the surface of the punching metal 9 of the positive electrode 4, nickel fiber felts 10, 10 can be sintered to both surfaces of the punching metal 9. In this case, on the rear side of the punching metal 9 electrolyte can be easily brought into contact with the positive electrode active material 11 carried on the nickel fiber felt 10. Particularly, the fiber pieces of the nickel fiber felts 10, 10 of both front and rear surfaces of the punching metal 9 are entangled with each other through the openings 9a of the punching metal 9. Thus, the binding strength of these nickel fiber felts 10, 10 can be enhanced.

In this embodiment, although the nickel-hydrogen secondary battery has been explained, the present invention can be applied to any battery as long as it is a battery capable of using a three-dimensional porous body for its electrode.

In this embodiment, although the nickel fiber felt 10 has been used as a three-dimensional porous body, any conductor which is three-dimensionally porous, e.g. nickel-foam can be used. In addition, the kind of the conductor is not limited to such nickel, but can be optionally selected according to the kind of the battery and electrode.

Further, in this embodiment, although the punching metal 9 of a nickel sheet has been used as a conductive sheet, any conductive sheet which includes a large number of openings having any shape and size can be used. For example, the sheet including macro or large openings such as an expandable metal, wire cloth, etc., or including micro or minute openings in foamy metal or non-woven metal compressed into a metallic sheet can be used. In addition, the kind of the conductor is not limited to such nickel, but can be optionally selected according to the kind of the battery and electrode.

In the embodiment, although a winding type power generating element 2 used for a cylindrical battery was proposed, the present invention can be applied to a laminating type power generating element used for a square pillar type battery. In the laminating type of the power generating element, the punching metal 9 and the nickel fiber felt 10 should not be band-like (lengthy sheet-like) but plate-like (short sheet-like).

EXPERIMENTAL EXAMPLE 1

Figure 5A:
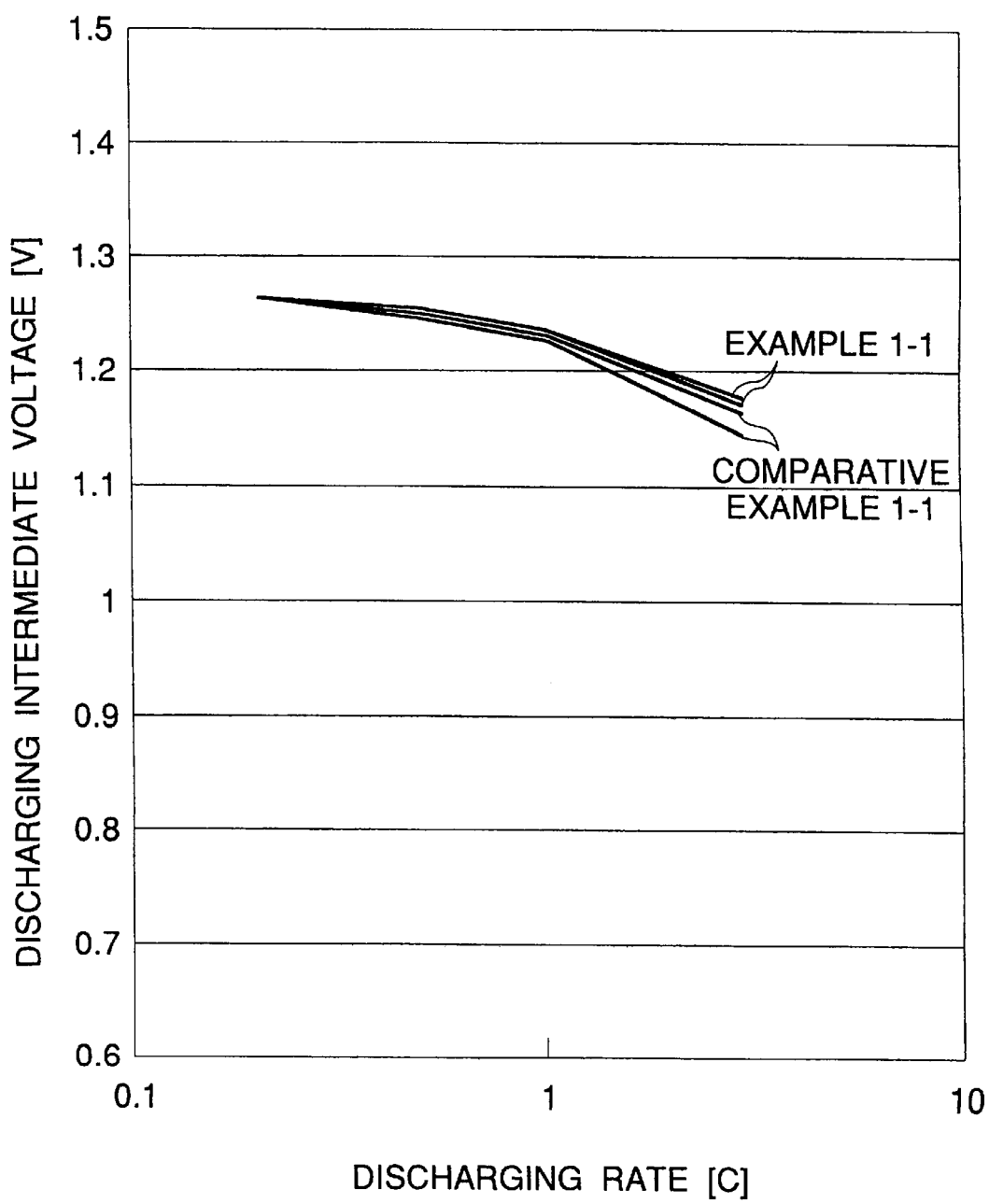
FIG. 5A is a graph showing the relationship between a discharging rate and a discharging intermediate voltage in Example 1-1 and Comparative Example 1-1.
Figure 8:
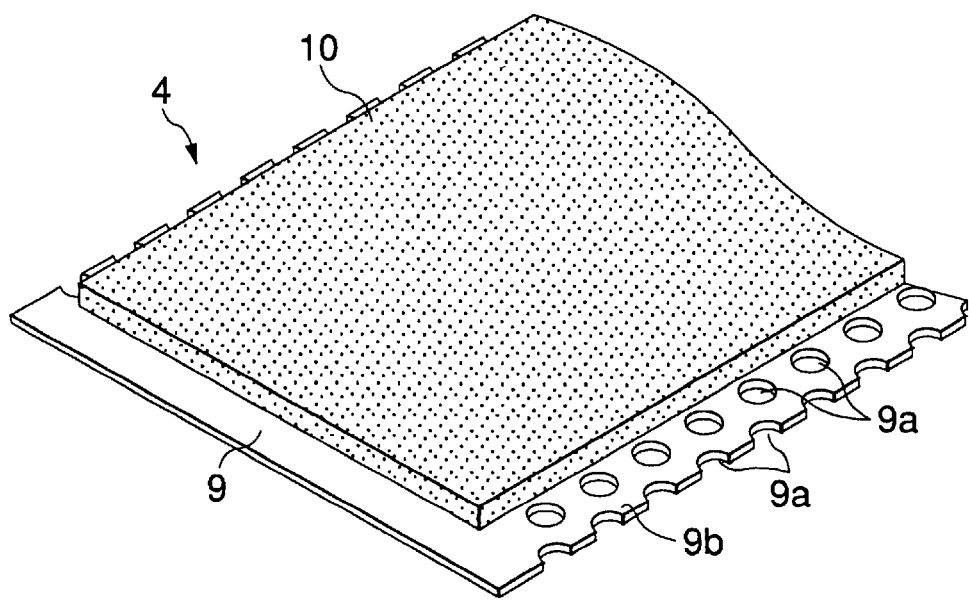
FIG. 8 is a perspective view of an embodiment according to the present invention.
Figure 9:
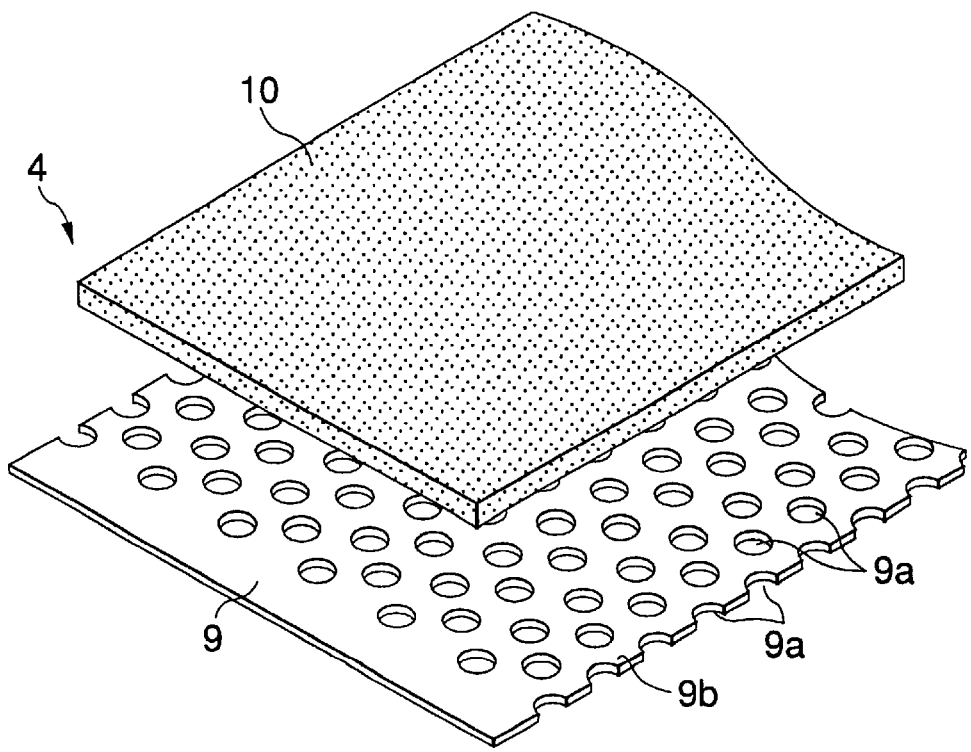
FIG. 9 is an exploded perspective view showing the structure of a positive electrode.
Figure 10:
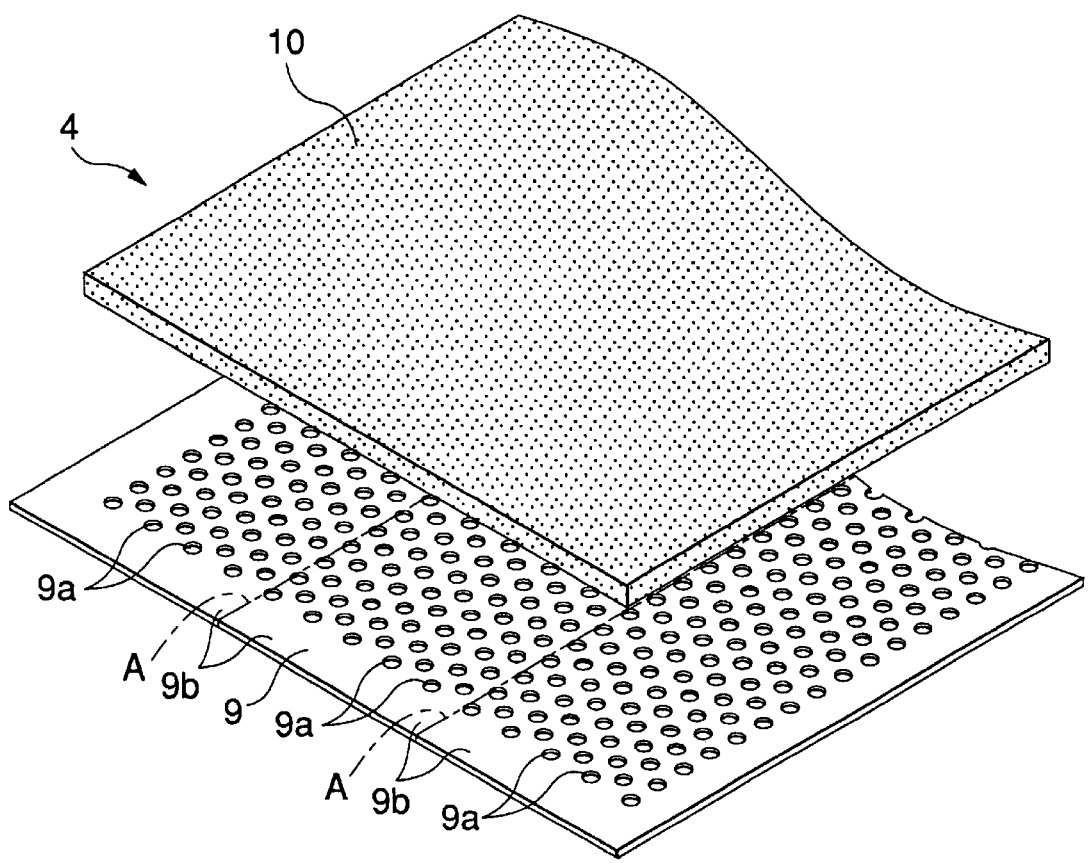
FIG. 10 is an exploded perspective view showing the state of the first step of the process of manufacturing a plurality of positive electrodes.

Ten nickel-hydrogen secondary batteries as Example 1-1 according to the present invention were manufactured by using the positive electrode 4 in which no opening 9a is formed at the edge area 9b shown in FIG. 2, and ten nickel-hydrogen secondary batteries as Comparative Example 1-1 in which the openings 9a are formed at the edge area 9b shown in FIG. 8. The discharging intermediate voltage with the discharging rate changed for each of batteries of Example 1-1 and the Comparative Example 1-1 is shown in FIG. 5A. FIG. 5A shows that the test results of the battery according to the Example 1-1 and Comparative Example 1-1 is within their own ranges. As seen from the graph of FIG. 5A, the batteries of the Example 1-1 according to the present invention provide higher discharging voltages with less variation than those of the comparative Example 1-1. Specifically, as the discharging rate of a battery increases, the voltage drop due to the internal resistance thereof decreases. The battery according to the present invention provides a relatively small rate of the reduction in the discharge intermediate voltage even when the discharging rate increases, thereby surely improving the battery performance. On the other hand, in the battery according to the Comparative Example 1-1, the openings 9a formed at the edge area 9b of the positive electrode 4 deteriorate the current collecting efficiency of the upper collecting plate 7 to increase the internal resistance. Therefore, when the discharging rate increases, the discharge intermediate voltage decreases greatly, thereby deteriorating the battery performance. In addition, the area of the notches due to the openings 9a of the edge area 9b varies for each battery so that the battery performance will vary greatly.

As described above, the electrode of the battery according to the present invention permits the entire edge area of the collecting sheet to be connected to the conductive plate. This increases the current collecting efficiency and reduces the internal resistance, thereby enhancing the battery performance.

In the battery which is manufactured in such a manner the areas of three-dimensional porous body joined to the conductive sheet are pressed, active material is carried therein and the pressed areas are cut. Therefore, the entire edge area thus cut can be connected to the current collecting plate, thereby enhancing current collecting efficiency thereby decreasing the internal resistance of the battery and enhancing the battery performance.

EXPERIMENTAL EXAMPLE 2

The batteries according to the present invention as Example 2-1 and Comparative Examples 2-1 and 2-2 described below have been manufactured and compared with each other.

EXAMPLE 2-1

SC type Ni-MH battery

Positive electrode plate size: 188 mm (length)×31.5 mm (width)×0.80 mm (thickness)

Negative electrode plate size: 235 mm (length)×31.5 mm (width)×0.43 mm (thickness)

Electrolyte: 31 wt % (weight %) solution of potassium hydroxide (KOH) with lithium hydroxide (LiOH) of 30 g/l Rated capacity: 2.5 Ah

COMPARATIVE EXAMPLE 2-1

Positive electrode plate size: 188 mm (length)×31.5 mm (width)×0.76 mm (thickness)

(with the active material removed and the current collecting terminal ultrasonic-welded)

Other items are the same as those of Example 2-1.

COMPARATIVE EXAMPLE 2-2

Positive electrode plate size: 188 mm (length)×31.5 mm (width)×0.73 mm (thickness)

Conductive sheet: 188 mm (length)×34 (width)×0.06 mm (thickness) (wound together with the positive electrode)

Other items are the same as those of Example 2-1.

In the conventional method of the Comparative Example 2-1, only five cells per minute (batteries according to five cells per minute) could be manufactured. On the other hand, in the method according to the present invention, which can omit the removal of the active material for each electrode and welding of the current collecting terminal, 12 cells/min can be manufactured in any case, thereby improving the productivity.

Figure 5B:
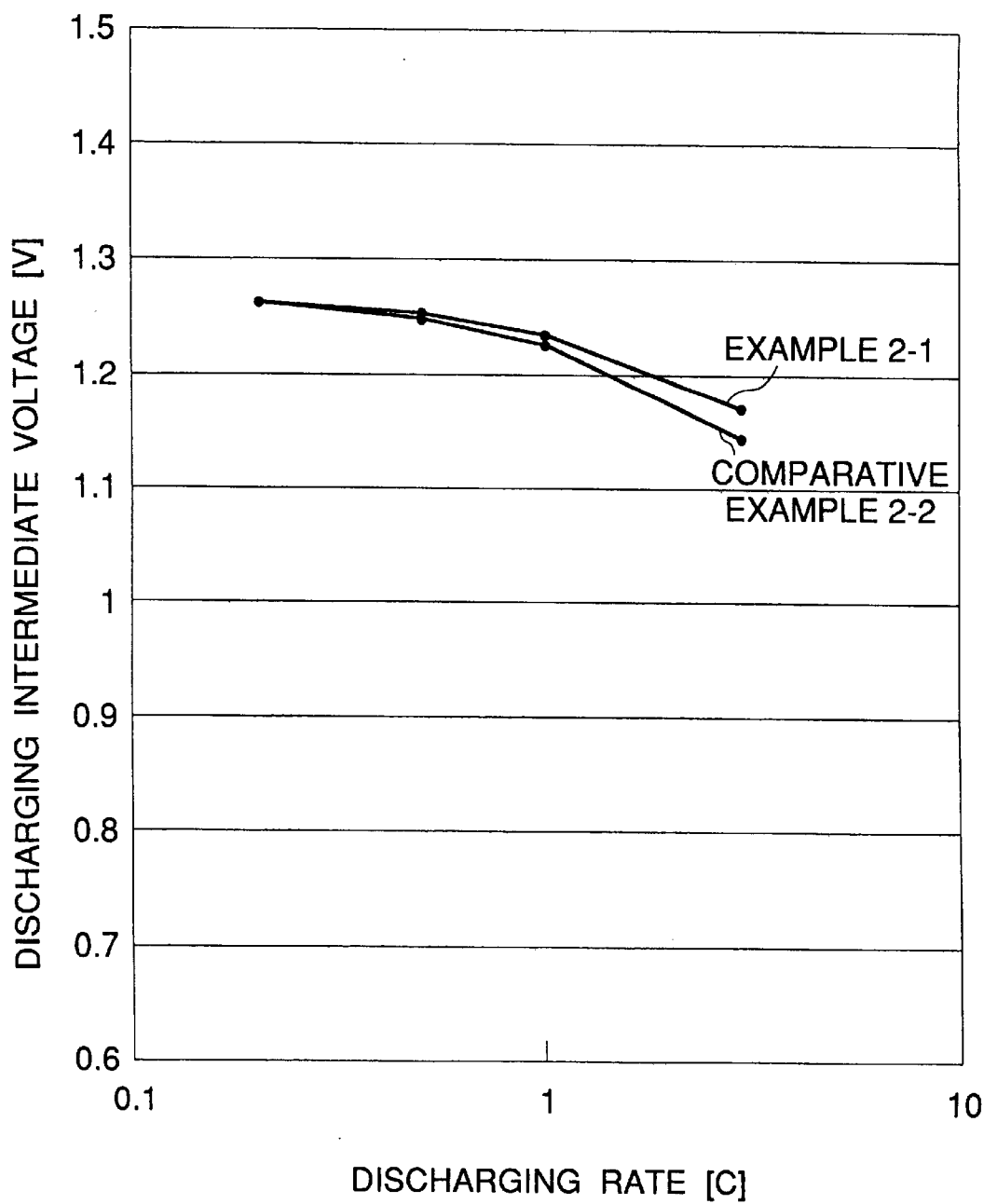
FIG. 5B is a graph showing the relationship between a discharging rate and a discharging intermediate voltage in Example 2-1 and Comparative Example 2-2.

As regards the batteries as the Example 2-1 according to the present invention and the Comparative Example No. 2-2, the measurement result of their discharge intermediate voltage versus changes of a discharging rate is shown in FIG. 5B. As the discharging rate of the battery increases, the voltage drop by the internal resistance of the battery also increases, thereby attenuating the discharge intermediate voltage. In the embodiment of the present invention, the three-dimensional porous body of the positive electrode is sintered to the conductive sheet, whereas in the Comparative Example 2-2, the three-dimensional porous body is only kept in contact with the conductive sheet, thus giving large contact resistance. For this reason, as compared with the battery in the Comparative Example 2-2, in the battery in the Example 2-1 of the present invention, the rate of attenuation of the discharge intermediate voltage becomes small when the discharging rate increases, thus giving a high current collecting characteristic.

As described above, in accordance with the method of manufacturing the battery electrode according to the present invention, the three-dimensional porous body can be sintered to the conductive sheet, thereby making sure electrical connection therebetween. This permits stable current collection through the conductive sheet. Moreover, there can be omitted the step of previously pressing an area of the three dimensional body for each electrode or removing the active material to weld the current collector to the three dimensional porous body before its winding. By transferring the conductive sheet as a support, without extending or cutting the three-dimensional porous body, the active material carrying step can be performed. Thus, the productivity of the battery can be improved.

If the three-dimensional porous bodies are sinter-joined to both surfaces of the conductive sheet, the using rate of the electrode can be enhanced. In addition, particularly, where the three-dimensional porous body of non-woven cloth is used, the fiber pieces of the three-dimensional porous bodies of both front and rear surfaces are entangled with each other through the openings of the thin conductive sheet. Thus, the binding strength of these three-dimensional porous bodies is enhanced.

If the three-dimensional porous body is pressed before it carries the active material, the current collector can be easily connected to the pressed area. Thus, a plurality of sheets of electrodes can be manufactured and cut so that they can be manufactured effectively in a processing line or the like.

What is claimed is:

1. A battery electrode carrying an active material in a joined body comprising:

a conductive sheet having a plurality of openings made in its surface exclusive of at least one edge area thereof; and a sheet-shaped three dimensional metallic porous body joined to the surface, including said one edge area, of said conductive sheet and said porous body having a pressed portion joining to said at least one edge area.

2. A battery electrode according to claim 1, wherein said three-dimensional metallic porous body is joined to the surface of said conductive sheet by sintering.

3. A method for manufacturing a battery electrode comprising the steps of:

sintering a sheet-shaped three-dimensional porous body to a surface of a conductive sheet containing a plurality of openings made in its surface exclusive of at least one edge area thereof; and applying an active material to the three-dimensional porous body sintered by said sintering step.

4. A method of manufacturing a battery electrode according to claim 3, wherein said sintering step is to sinter sheet-shaped porous bodies on both surfaces of the conductive sheet having a plurality of openings.

5. A method of manufacturing a battery electrode according to claim 4, further comprising the steps of:

pressing an area of each three-dimensional porous body joined to the conductive sheet by said sintering step, said active material applying step being performed after said three-dimensional porous bodies have been partially pressed by said pressing step; and cutting the three-dimensional porous bodies with the active material therein together with the conductive sheet at a pressed portion.

6. A method of manufacturing a battery electrode according to claim 5, wherein said step of cutting is performed between the edges of said pressed portion.

7. A method of manufacturing a battery electrode according to claim 3, further comprising the steps of:

pressing an area of the three-dimensional porous body joined to the conductive sheet by said sintering step on the conductive sheet side, said active material applying step being performed after said three-dimensional porous body has been partially pressed by said pressing step;

cutting the three-dimensional porous body with the active material therein together with the conductive sheet at a pressed portion.

8. A method of manufacturing a battery electrode according to claim 7, wherein said step of cutting is performed between the edges of said pressed portion.

* * * * *